May 30, 1950  J. E. HENRY, SR  2,509,301
VISUAL STUDY AID FOR TRIGONOMETRY
Filed Feb. 5, 1948  2 Sheets-Sheet 1
Fig.1.
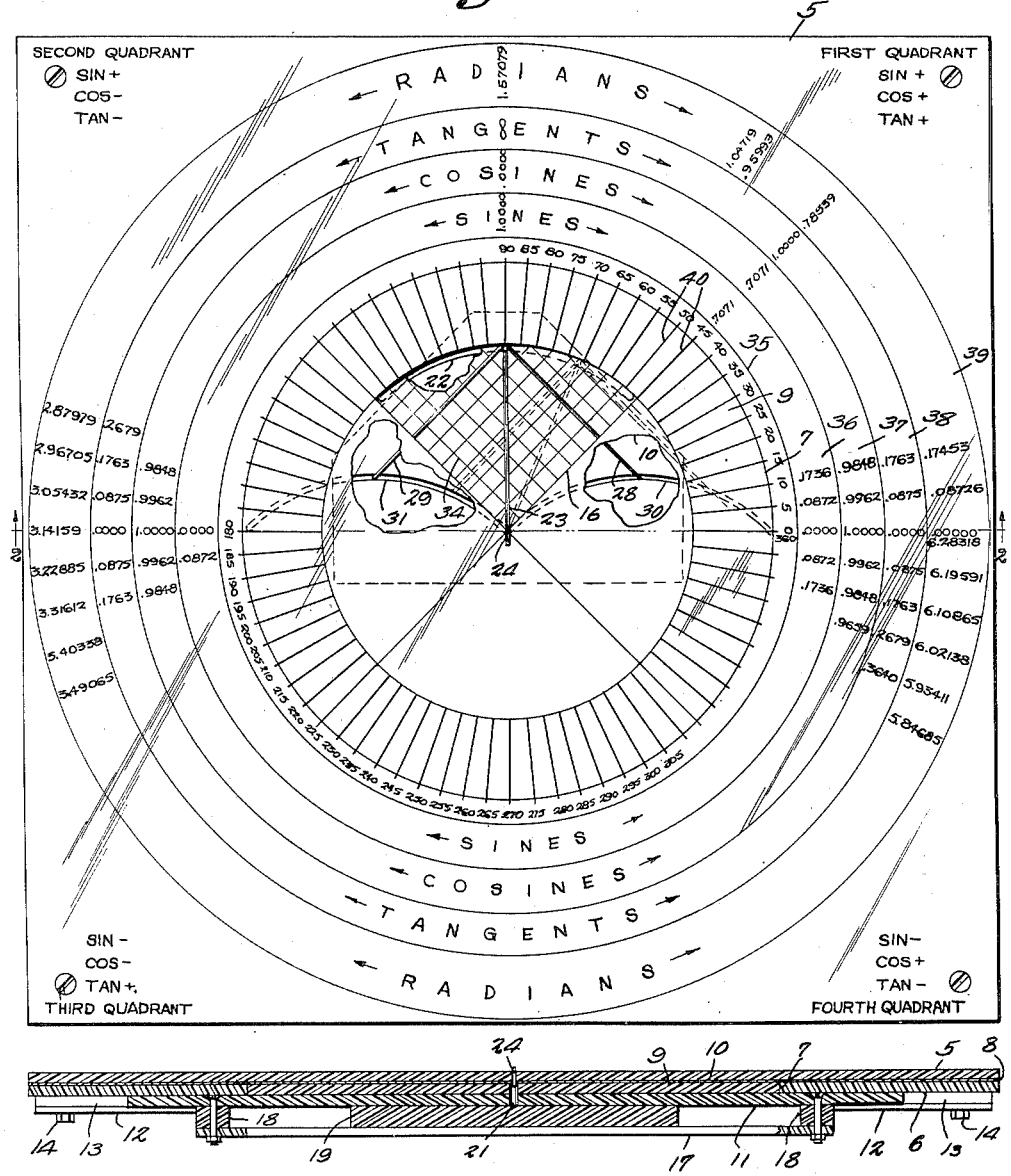
Fig.2.
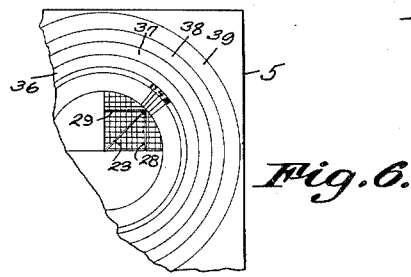
Fig.6.
J. E. Henry Sr.
INVENTOR
BY C. A. Snow & Co.
ATTORNEYS.

May 30, 1950 J. E. HENRY, SR 2,509,301
VISUAL STUDY AID FOR TRIGONOMETRY
Filed Feb. 5, 1948 2 Sheets-Sheet 2
Fig. 3.
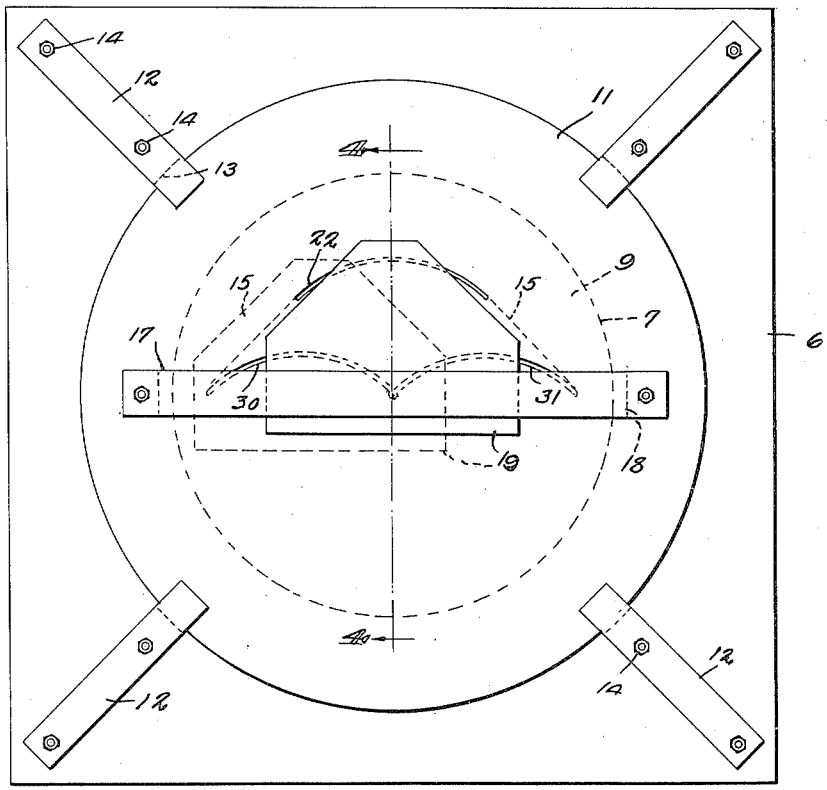
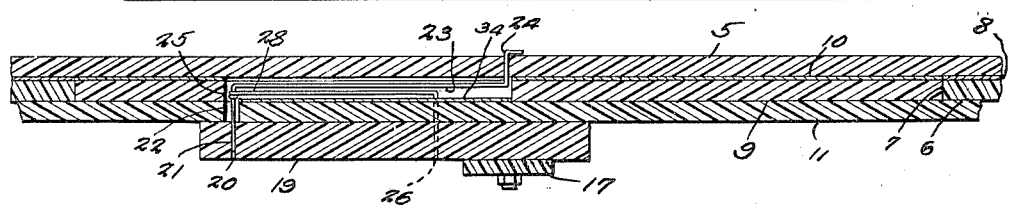
Fig. 4.
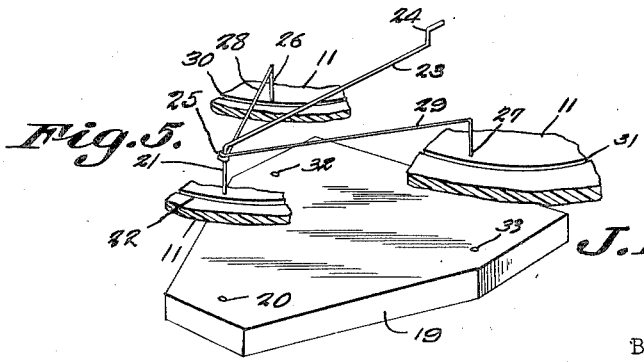
Fig. 5.
J. E. Henry Sr.
INVENTOR
BY C. A. Snow & Co.
ATTORNEYS.

Patented May 30, 1950

2,509,301

UNITED STATES PATENT OFFICE 2,509,301

VISUAL STUDY AID FOR TRIGONOMETRY

James E. Henry, Sr., Miami, Fla.

Application February 5, 1948, Serial No. 6,385

10 Claims. (Cl. 35—30)

This invention relates to a visual study aid for students of trigonometry.

The primary object of the invention is to provide a device which can be operated by a student in a manner to show visually the relationship between sines, co-sines, and tangents, by provision of a means whereby the student can observe for himself the actual relationships between the sides and angles of a unit right triangle, and the trigonometric functions determined thereby.

Another important object is to provide a device of the type stated which is unusually simple in operation, so that a student can with complete ease and maximum speed adjust the relatively moving parts of the device for the purpose of setting it at desired points.

Still another important object is to provide a device of the type stated which can be manufactured at low cost, but which will nevertheless be extremely durable so as to be capable of serving over a long period of time.

Another important object is to provide a device which can be made in various sizes, either for use by individual students, or in large sizes for use in demonstrating to an entire class.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a top plan view of a study aid constructed in accordance with the invention, portions being broken away to show details of construction.

Figure 2 is a section on line 2—2 of Figure 1.

Figure 3 is a bottom plan view, the dotted lines indicating another position of a movable block embodied in the invention.

Figure 4 is an enlarged section taken substantially on line 4—4 of Figure 3.

Figure 5 is an exploded perspective view of the block and a plurality of arms operated thereby, a disc through which the arms extend being shown only fragmentarily.

Figure 6 is a fragmentary plan view, somewhat diagrammatic, that shows how the device is used.

Referring to the drawings in detail, the reference numeral 5 designates a cover plate of clear plastic material. Other materials might well be used, if desired. The cover plate is flat, as seen from Figure 2, and from Figure 1, may be noted as being square in outer conformation. It is not critical to the invention, however, that the plate be square. The cover plate serves the purpose of protecting the legend on the face of the device from becoming illegible through continued use, and also serves to protect moving parts of the device.

To the under side of the cover plate 5 is secured a lower plate 6. Preferably, this has the same outer configuration as the cover plate. A rather large circular opening 7 (Figures 1 and 3) is formed, however, at the center of the lower plate.

Interposed between the two plates is a sheet 8 printed with concentric series of markings details of which will be given in discussing the operation of the device. This sheet is formed with a central opening that registers with opening 7, so as not to cover any part of said opening. The markings are visible through the clear cover plate.

The two plates together constitute a frame that supports for rotation the other parts of the device.

Mounted for rotation in opening 7 is an upper disc 9. Secured adhesively or otherwise to the top face of this disc is a sheet 10, which can be of stiff paper, thin plastic, or other suitable material.

Cemented to the under side of the upper disc 9 is a lower disc 11. This is of greater diameter than the upper disc, so that its marginal portion is in engagement with the under side of the lower plate 6, as best shown in Figure 2.

The discs 9 and 11 together define a rotatable center portion carried by the frame.

For the purpose of holding the frame assembled with the center portion, there can be provided a plurality of radially disposed retaining strips 12. As seen from Figure 3, the inner ends of these strips underlie the lower disc 11. Spacers 13 are interposed between the retaining strips and the under side of lower plate 6. Fastening means 14 hold the parts assembled.

Formed in the upper disc 9 is an opening 15, and formed in the sheet 10 that overlies this disc is an opening 16. Opening 16, as best seen from Figure 1, is in outline a quadrant of a circle. Opening 15, however, is extended beyond the legs of the quadrant, on both sides, for the purpose of providing sufficient room for necessary movement of a pair of stiff wire arms, to be described.

Secured to the under side of the lower disc 11 is an elongated strip 17 that is both a handle for rotating the discs or center portion of the device, and a keeper for a movable block supported between strip 17 and disc 11. Keeper 17 is spaced away from disc 11 by means of spacer elements 18. The movable block has been designated at 19. In the present instance, block 19 is shown hexagonal (Figure 5) but this particular shape is not critical.

Adjacent one end, there is formed in the block 19 an opening 20. A length of stiff wire has one end downturned to provide a pintle 21 that is journaled in the opening 20. Pintle 21 prior to being entered into the opening 20 is extended through an arcuate slot 22 formed in the lower disc 11. The pintle can move from end to end of this slot. As best seen from Figure 1, the slot 22 is in line with the outer, arcuate edge of quadrant opening 16, and terminates at the intersection of said arcuate edge with the straight sides of the quadrant opening.

The intermediate portion of the wire having pintle 21 at one end is formed as a straight radius arm 23. The other end of the wire is upturned as at 24 and is journaled in an opening formed in the cover plate 5 at the center point thereof.

By reason of this construction, it is seen that block 19 can be moved in an arcuate path. One extreme position of movement is illustrated in dotted lines in Figure 3.

In addition to the wire mentioned, I utilize another length of stiff wire the intermediate portion of which is bent to provide a loop 25 through which the pintle 21 of radius arm 23 is extended. This permits relative swinging movement of the two lengths of wire used. The ends of the second length of wire are both downturned to provide pintles 26 and 27. Between said pintles and the center loop, there are defined legs 28 and 29. These are disposed perpendicularly to each other, and remain perpendicular to each other at all times. Pintle 26 extends through an arcuate slot slot 30 formed in the lower disc 11. This slot has one end disposed at or close to the center point of the disc, and the other end near the marginal portion.

Pintle 27 extends through a slot 31, disposed on the opposite side of the center or axis of disc 11. Pintle 26 is journaled in opening 32 formed in the movable block 19, while pintle 27 is journaled in opening 33 of the block.

As has been mentioned, the opening 15 formed in the upper disc 9 is made sufficiently large to accommodate the ends of the legs 28 and 29. Portions of these legs disappear, as best seen in Figure 1, under the thin sheet 10 that covers the side portions of opening 15. The remaining portions of the legs 28 and 29 are, however, visible through the quadrant opening 16 formed in said sheet 10.

Preferably, there is adhesively secured to the bottom of opening 15 of the upper disc a sheet of coordinate or graph paper 34, that is visible through the quadrant opening 16. However, this is not critical to the invention.

The structural features of the invention having been described, the operation of the device as a study aid, designed to permit an easier understanding of relationship between sines, co-sines, and tangents, and their varying values in each of the four quadrants of a circle, as determined by the lengths of the legs of a right triangle whose hypotenuse is unity, will now be discussed.

The sheet 8 under cover plate 5 of the frame is marked with certain indicia. These are arranged in a number of concentric series. The innermost series of the fixed or frame portion of the device is designated 35. This series borders the edge of opening 7 of the frame. In this series beginning at 0° in the east position and moving around the series in a counter-clockwise direction, the full 360° of a circle is marked in 5° divisions.

The next concentric series, designated 36, shows the values, to four decimal places, of the sines, corresponding to each 5° division marking. Then, other and increasingly larger concentric series 37, 38, and 39, provide the values to four decimal places of the co-sines, tangents, and radians, again corresponding to each 5° division marking.

In the drawings I have only shown some of the markings, but it will be readily understood that every 5° division up to 360° will be shown in series 35, and a corresponding value will be shown in the other series for each of these degree markings.

The sheet 10 superposed on the upper disc 9 is provided with an annular series of radial lines 40. Since disc 9 is rotatable relative to the frame, it can be seen that on rotation of the disc, the lines 40 can be brought into alignment with the degree series 35, thus permitting a more exact reading. In such a case, any of the various lines 40 becomes an extension, so to speak, of the radius arm 23, as readily seen from Figure 1.

In use, the center portion of the device is first rotated until quadrant opening 16 is in the first quadrant of a circle, as shown in Figure 6. The movable block 19 can now be moved so as to position radius arm 23 in line with any desired degree marking. In the example illustrated in Figure 6, the radius arm points to 45°.

As previously stated, the use of the graph paper is not critical to the invention. However, it serves as an aid in a better understanding of the device by students who would use it. Referring to Figure 1, it is seen that there are ten squares of the graph paper for each side of the quadrant. In other words, the length of the radius arm 23 is ten squares.

Perpendiculars to the sides of the quadrant from the outer end of the radius are defined by the legs 28 and 29. These form the legs of two right triangles whose common hypotenuse is the radius, and whose other legs are defined by the sides of the quadrant. Since radius 23 and legs 29 and 28 are movable as a unit to any position in the quadrant without changing the perpendicularity of 29 and 28 to the respective sides of the quadrant, any other position can be denoted by said radius and legs. The position illustrated in Figure 6 is provided merely as an example.

Since radius 23 is taken as unity and is ten squares in length, legs 29 and 28 can be measured roughly by inspection, by noting the number of squares and fraction of a square beneath these legs in any position in which they are placed.

Proceeding further, since the legs of a right triangle can never be greater than the hypotenuse, and since the hypotenuse is unity, the legs must always be unity or less than unity. In the example illustrated in Figure 6, both 29 and 28 would be a fraction over seven squares long or 0.7 of the hypotenuse.

In the illustrated example in Figure 6, radius 23 points to 45°. The sine of either acute angle of a right triangle is the ratio of the side opposite the acute angle to the hypotenuse. In this case, an acute angle is formed by the horizontal side of the quadrant and radius 23, and is 45°. Leg 28 is the opposite side. Therefore, the sine of 45° is the ratio of 28 to 23 or a little more than 0.7.

Looking in the sine series of the frame, it will be seen that the sine of 45° is actually 0.7071. If radius 23 were moved to point to 10° exactly, the value of leg 28 would be .1736.

As the radius 23 approaches 90°, leg 28 approaches a length of unity or coincidence with the radius, and at 90° the ratio of the leg to the radius is 10/10 or 1/1, which, of course, is 1. It will be seen that sin 90 is 1.000. On the other hand, when the radius approaches 0°, leg 28 becomes smaller and at 0° leg 28 becomes 0 and the ratio of the leg to the radius becomes 0/10. Sin 0 is .0000.

As to co-sines, the co-sine of either acute angle of a right triangle is the ratio of the side adjacent to the acute angle, to the hypotenuse. In the illustrated example, the acute angle is formed as for the sine values, but the length of the adjacent side is determined by the length of the projection of the radius upon the horizontal side of the quadrant. This is the distance from the lower end of leg 28 to the center or point of origin, which is the inner end of the radius 23. However, since leg 28 is always perpendicular to the horizontal side of the quadrant and leg 29 is perpendicular to the vertical side of the quadrant, and the two sides of the quadrant form a right angle, it is readily seen that leg 29 is equal always to the projection of radius 23 on the horizontal side of the quadrant, no matter where the radius is placed in the quadrant. Therefore, the co-sine of 45° is the ratio of leg 29 to radius 23, or a little more than 0.7. Looking in the co-sine series, it is seen that cos 45° is 0.7071.

If, however, radius 23 were to be lined up with 10°, the co-sine value would be .9848.

To summarize the foregoing, it will be seen that at 0°, that is when the radius points to 0°, the sine is 0 and the co-sine is 1. As the radius is moved toward 90°, the sine begins to approach unity in value and the co-sine decreases from unity to 0 at the same rate. At 45° they are equal. At 90° the sine is unity and co-sine is 0. It can be readily seen that by use of the device, a student can much more easily grasp the relationship and varying values of the sines and co-sines by moving the radius from 0° to 90 and back again, watching leg 28 increase in value and leg 29 decrease as the radius moves towards 90° and by noting the decrease in value of leg 28 and increase in leg 29 as the radius is moved back toward 0°. Since the tangent values of either of the acute angles of a right triangle are given by the ratio of the opposite side to the adjacent side, it is seen that tan 45° is the ratio of leg 28 to leg 29, which is 1.

The radian values given in the outermost circle simply show the relationship between angles measured around a circle in degrees and in radians. It will be seen that 1 radian lies between 55° and 60°. Actually, it is 57.296°.

The values of the trigonometric functions of the angles in the second, third, and fourth quadrants can be determined in the same way as in the first. The only difference will be that the legs 28 and 29 would be substituted, so far as trigonometric functions are concerned, for each other. In other words, leg 28 will now be perpendicular to the vertical side of the quadrant, considering the second quadrant position. In this case, of course, the cosine and tangent values in the second quadrant would both require a negative sign before them, an appropriate legend being provided in the upper left hand corner of the frame.

It is to be noted that the device is primarily to be used as a visual aid to education, and cannot replace tables of the values of trigonometric functions.

It should further be noted that if desired, the axes of abscissas and ordinates in a system of fixed rectilineal coordinates could be shown on the device, as by forming two intersecting lines, one vertical and one horizontal (considering Figure 1), on the cover plate. These would be a further help in showing the four quadrants, though not absolutely essential to use of the device.

What is claimed is:

1. A device for forming selected angles including a disc member, said member having a plurality of arcuate slots formed therein, a single block slidable over one face of said member, and a plurality of interconnected arms journaled in the block and extended through the slots, thereby to be positioned in selected angular relationships to each other on movement of the block relative to the disc member, one of said arms constituting a radius arm and being journaled at opposite ends in the block and disc member respectively, the other arms being each journaled at one end in the block and at the other end being pivotally connected to the first named end of the radius arm.

2. In a study aid, a frame, a circular center portion rotatably mounted therein, a block mounted on the center portion for straight-line sliding movement thereacross, and means cooperating between the center portion and block adapted to define selected angles on movement of the block relative to said center portion, said means comprising a radius arm connected to the block and center portion respectively, and other arms respectively connected to the radius arm and block.

3. In a study aid, a frame, a circular center portion rotatable therein, a block mounted for straight-line sliding movement upon one face of the center portion, a radius arm pivotally connected at one end to the block and at the other end to the center portion, a pair of other arms pivotally connected at one end to the block and at their other ends to the last-named end of the radius arm, all of said arms cooperating to define selected angles on movement of the block relative to the center portion.

4. In a study aid, an indicia-marked frame having a central opening, a center portion journaled for rotation in the opening, a block movably mounted on the center portion, and a plurality of arms movably connected to the block and center portion respectively and adapted to define selected angles between them on movement of the block relative to the center portion, one of said arms being disposed radially relative to said center portion.

5. In a study aid, an indicia-marked frame, a center portion journaled for rotation therein, there being a plurality of arcuate slots formed in the center portion, a block slidably mounted on one face of the center portion, and a plurality of interconnected arms journaled in the block and extended through the slots, thereby to be positioned in selected angular relationships to each other on movement of the block relative to the center portion.

6. A study aid as in claim 5 in which the indicia markings of the frame are disposed in radial series of trigonometric values, and wherein one of the arms is disposed radially relative to the center portion.

7. In a study aid, an indicia-marked frame, a center portion rotatable therein, the center portion having a plurality of spaced apart arcuate slots extending therethrough, there being an opening in the shape of a quadrant of a circle formed in the center portion, a block slidable on the center portion, and a plurality of wire arms journaled in the block and extended through the slots, whereby to vary the relationship of said arms to each other on movement of the block relative to the center portion, one of said arms being disposed as a radius of the center portion, the other arms being pivoted to aid radius.

8. In a study aid an indicia-marked frame having a circular center opening, a circular center portion rotatably mounted in said opening, said center portion having a recess in the shape of a quadrant formed in its upper face and having a plurality of arcuate slots extending therethrough, a block mounted on the under side of the center portion for straight-line sliding movement thereacross, and a plurality of arms movably connected to the block and center portion respectively and extending into said recess, said arms adapted to define selected angles between them on movement of the block relative to the center portion, one of said arms being disposed radially to said center portion, said arms extending through the slots.

9. In a study aid an indicia-marked frame having a circular center opening, a circular center portion rotatably mounted in said opening, said center portion having a recess in the shape of a quadrant formed in its upper face and having a plurality of arcuate slots extending therethrough, a block mounted on the under side of the center portion for straight-line sliding movement thereacross, and a plurality of interconnected arms journaled in the block and extended through the slots, thereby to be positioned in selected angular relationships to each other on movement of the block relative to said center portion, one of said arms constituting a radius arm and being journaled at opposite ends in the block and center portion respectively, the other arms being each journaled at one end in the block and at the other end being pivotally connected to the first named end of the radius arm.

10. In a study aid an indicia-marked frame having a circular center opening, a circular center portion rotatably mounted in said opening, said center portion having a recess in the shape of a quadrant formed in its upper face and having a plurality of arcuate slots extending therethrough, a block mounted on the under side of the center portion for straight-line sliding movement thereacross, said arms being formed from lengths of wire material, one of said arms constituting a radius arm and being journaled at opposite ends in the block and center portion respectively and being extended intermediate its ends through one of the slots, the other arms being permanently connected at right angles to each other and being pivoted at their point of connection to the first named end of the radius arm, the free ends of said last named arms being extended through the other slots and being journaled in the block.

JAMES E. HENRY, Sr.

REFERENCES CITED

The following references are of record in the file of this patent:

UNITED STATES PATENTS

| Number | Name | Date |
|---|---|---|
| 378,257 | Leschorn | Feb. 21, 1888 |
| 1,541,179 | Parkinson | June 9, 1925 |
| 1,955,392 | Shimberg | Apr. 17, 1934 |

FOREIGN PATENTS

| Number | Country | Date |
|---|---|---|
| 169,495 | Great Britain | Sept. 22, 1921 |
| 381,788 | Germany | Sept. 24, 1923 |